US008463634B2

(12) United States Patent
Kulkarni et al.

(10) Patent No.: US 8,463,634 B2
(45) Date of Patent: Jun. 11, 2013

(54) EFFICIENT SYSTEM FOR REALIZING BUSINESS PROCESS FAMILIES USING MODEL-DRIVEN TECHNIQUES

(75) Inventors: Vinay Kulkarni, Pune (IN); Souvik Barat, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 13/182,937

(22) Filed: Jul. 14, 2011

(65) Prior Publication Data

US 2012/0053974 A1 Mar. 1, 2012

(30) Foreign Application Priority Data

Aug. 16, 2010 (IN) .......................... 2302/MUM/2010

(51) Int. Cl.
 *G06Q 10/00* (2006.01)
(52) U.S. Cl.
 USPC .......................... 705/7.12; 705/7.23; 717/104
(58) Field of Classification Search
 None
 See application file for complete search history.

(56) References Cited

U.S. PATENT DOCUMENTS

| | | | | |
|---|---|---|---|---|
| 7,003,560 | B1 * | 2/2006 | Mullen et al. | 709/223 |
| 7,548,871 | B2 * | 6/2009 | Ricketts | 705/7.12 |
| 7,707,158 | B2 * | 4/2010 | Bogner et al. | 707/999.102 |
| 7,840,896 | B2 * | 11/2010 | Tien et al. | 715/243 |
| 2001/0044738 | A1 * | 11/2001 | Elkin et al. | 705/8 |
| 2002/0065701 | A1 * | 5/2002 | Kim et al. | 705/9 |
| 2002/0143595 | A1 * | 10/2002 | Frank et al. | 705/8 |
| 2002/0147624 | A1 * | 10/2002 | Yoshida et al. | 705/8 |
| 2002/0173997 | A1 * | 11/2002 | Menard et al. | 705/7 |
| 2002/0178035 | A1 * | 11/2002 | Lajouanie | 705/7 |
| 2004/0024622 | A1 * | 2/2004 | Knight | 705/7 |
| 2004/0039619 | A1 * | 2/2004 | Zarb | 705/7 |
| 2004/0059611 | A1 * | 3/2004 | Kananghinis et al. | 705/7 |
| 2004/0128001 | A1 * | 7/2004 | Levin et al. | 700/31 |
| 2004/0162844 | A1 * | 8/2004 | Thome et al. | 707/102 |
| 2004/0181775 | A1 * | 9/2004 | Anonsen et al. | 717/104 |
| 2004/0260590 | A1 * | 12/2004 | Golani et al. | 705/8 |
| 2005/0060224 | A1 * | 3/2005 | Ricketts | 705/11 |
| 2005/0234902 | A1 * | 10/2005 | Meredith et al. | 707/4 |
| 2006/0074736 | A1 * | 4/2006 | Shukla et al. | 705/8 |
| 2006/0184410 | A1 * | 8/2006 | Ramamurthy et al. | 705/8 |
| 2006/0229923 | A1 * | 10/2006 | Adi et al. | 705/8 |

(Continued)

OTHER PUBLICATIONS

IBM Research Disclosure 436174, "User-Controlled Notification in Workflow Management Systems", Aug. 2000, pp. 1490-1491.*

(Continued)

*Primary Examiner* — Gurkanwaljit Singh
(74) *Attorney, Agent, or Firm* — Schmeiser, Olsen & Watts LLP

(57) ABSTRACT

The present invention provides a system and method for developing a set of business process definitions sharing the common business intent as a business process family using model-driven techniques. The present invention minimizes on development time and resources thus leading to a cost effective system and method for developing business process families. The invention enables to create a business process family which can be easily configured to behave as a specific business process thus meeting the needs of a set of apriori known situations. The invention supports configuration process at different stages (i.e. design time, and run time) of the business process application and also support extension of the configuration structure at different stages (i.e. design time, and run time). The invention enables to create a business process family which can be easily extended to meet the needs of an as yet unseen situation.

12 Claims, 5 Drawing Sheets

U.S. PATENT DOCUMENTS

| | | | |
|---|---|---|---|
| 2007/0021992 A1* | 1/2007 | Konakalla | 705/7 |
| 2007/0021993 A1* | 1/2007 | Chandra et al. | 705/7 |
| 2007/0150330 A1* | 6/2007 | McGoveran | 705/8 |
| 2007/0208765 A1* | 9/2007 | Li et al. | 707/101 |
| 2007/0226678 A1* | 9/2007 | Li et al. | 717/101 |
| 2007/0244892 A1* | 10/2007 | Narancic | 707/7 |
| 2007/0245297 A1* | 10/2007 | Kuester et al. | 717/104 |
| 2007/0250377 A1* | 10/2007 | Hill et al. | 705/11 |
| 2008/0300837 A1* | 12/2008 | Buco et al. | 703/6 |
| 2008/0312979 A1* | 12/2008 | Lee et al. | 705/7 |
| 2008/0312980 A1* | 12/2008 | Boulineau et al. | 705/7 |
| 2008/0313008 A1* | 12/2008 | Lee et al. | 705/10 |
| 2008/0313110 A1* | 12/2008 | Kreamer et al. | 706/12 |
| 2008/0313595 A1* | 12/2008 | Boulineau et al. | 717/101 |
| 2008/0313596 A1* | 12/2008 | Kreamer et al. | 717/101 |

OTHER PUBLICATIONS

Bogner et al., Method and Computer Program Product for Generating a Lightweight Ontological Data Model, Feb. 28, 2005.*

Bogner et al., Method and Computer Program Product for Dynamic Weighting of an Ontological Data Model, Feb. 25, 2005.*

Hanai et al, An Integrated Software Maintenance Environment Bridging Configuration Management and Quality Management, IEEE Computer society press, Oct. 24, 1988, pp. 40-44.*

Hugh W. Ryan, Scott R. Sargent, Tomothy M. Boudreau, Yannie S. Arvanitis, Stanton J. Taylor, and Craig Mindrum, "Practical Guide to Client Server Computing," Second Edition, 1998.*

Hugh W. Ryan, Michael W. Alber, Stanton J. Taylor, Richard A. Chang, Yannis S. Arvanitis, Michael C. Davis, Nancy K. Mullen, Shari L. Dove, Prem N. Mehra, and Craig Mindrum, "Netcentric Computing: Computing, Communications, and Knowledge," 1998.*

"Case-based Reasoning System for and Executive Briefing Book," IBM Technical Disclosure Bulletin, vol. 34, pp. 380-381 (1991).*

J. Smeets and S. Boyer, "Internet and Client Server Patent Information Systems: New Services From Derwent," Commercially Developed Systems/World Patent Information, 20, pp. 136-139 (1998).*

* cited by examiner

EFFICIENT SYSTEM FOR REALIZING BUSINESS PROCESS FAMILIES USING MODEL-DRIVEN TECHNIQUES

CROSS REFERENCE TO RELATED APPLICATION[S]

This application claims priority to Indian Patent Application to Kulkarni, et al., serial number 2302/MUM/2010, filed Aug. 16, 2010, the disclosure of which is hereby incorporated entirely herein by reference.

FIELD OF THE INVENTION

The present invention relates to supporting definition and execution of a set of related business processes as a business process family using model-driven techniques.

BACKGROUND

Business enterprises use IT systems as a mechanical advantage through automation of apriori well-defined repetitive operational tasks. With dynamics of business in the past being low, primary objective of business applications was to deliver certainty in a fixed operating environment. Increased dynamics has put new demands on businesses while opening up new opportunities that need to be addressed with cost effectiveness in ever-shrinking time window. Demands for agility and adaptiveness seem to be gaining over stability and robustness. Imparting these critical properties needs a new perspective for implementation of IT systems.

One of the principal concerns of enterprise IT is to design and develop flexible IT solutions that can rapidly adapt to changing operating environments. Separation of concerns is critical to enable flexibility. Separation of business process concern from application services is a critical requirement so that a given set of application services can be orchestrated as per a specific flow definition. It is observed that application services typically tend to vary along four dimensions, namely, Business logic (L), Design strategies (D), Architecture (A), and Technology platform (T). Current development practice is to make a set of purpose-specific choices along these dimensions, and encode them in a scattered and tangled manner. This scattering and tangling is the principal obstacle in adapting an existing implementation for the desired change. Large size of an enterprise application further exacerbates this problem. Model driven development approach enables developers to focus on specification of L-concern in terms of models and high level languages while addressing A-, D-, and T-concerns through model-based code generation already disclosed in the prior-arts. Specification-based generation of model-based generators further improves adaptiveness along A, D and T dimensions also already disclosed in the prior-arts. Service oriented architecture splits L-dimension through separation of business process concerns from application functionality. Application services have benefited, vis-a-vis adaptation to apriori known situations, from product-line architectures to some extent. However, prevalent business process specification languages are only capable of defining static processes i.e. it is possible to orchestrate a given set of application services as per the flow modeled in the process definition. No support exists for i) orchestrating a subset of the given set of services as per multiple flow definitions and, ii) orchestrating multiple sets of services as per multiple flow definitions. Without support of this nature the desired flexibility cannot be imparted to IT systems. Also, business processes that cater to similar business intent in a domain are likely to be similar. Being ignorant of these similarities would mean redundancies in business process specification thus leading to maintenance and evolution problems later. Ability to specify commonality while highlighting the variability can reduce redundancy and improve adaptability of business processes significantly.

Though highly desirable, very few practical approaches exist to enable dynamic business adaptation. Recent literature on reference process modeling addresses this requirement using variant management techniques. A reference process represents a family of process models which can be customized in different ways to meet situation specific needs. Some of the prior art approaches enable adaptation through configuration operator (such as enable, hide or block a configurable workflow element) and a set of change operations (such as INSERT, DELETE, MOVE and MODIFY) of process fragments. PESOA project supports adaptation through variant modeling based on BPMN specification. Some of the prior art approach goes beyond control flow and extends business process configuration to task-roles and task-objects.

However these approaches are based on fixed underlying models and address variability through fixed variation points. The existing business process management approaches support modeling and management of situation specific business processes. However, modeling and management of process variants are not adequately supported today. As a result, situation specific variants are either specified in the form of separate process models or expressed in terms of conditional branches within the same process model. Apart of being time and effort intensive, they lead to model redundancies which further complicate maintenance and evolution of business processes.

Thus, in the light of the above mentioned state of the art, it is evident that there is a need for a system and a method which enables:

Development of a set of business process definitions sharing the common business intent as a business process family using model-driven techniques Development of a business process family in a cost effective manner minimizing time and resources Meeting the requirements of apriori known situation, to be supported by a business process definition, through easy configuration of the business process family; and Meeting the requirements of as yet unseen situation, to be supported by a business process definition, through easy extension of the business process family

SUMMARY

Before the present systems and methods, enablement are described, it is to be understood that this invention is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present invention.

The principle object of the present invention is to provide a system and a method for developing a set of business process definitions sharing the common business intent as a business process family using model-driven techniques.

Another object is to provide a method for supporting development of business process families in a cost effective manner by minimizing the development time and resources.

Yet another object is to enable easy configuration of the business process family so as to meet the requirements of apriori known situations.

Still another object is to enable easy extension of the business process family so as to meet the requirements of as yet unseen situation.

Still another object is to support the configuration process at different stages (i.e. design time, and run time) of the business process family.

Further, an object is to support extension of the configuration structure at different stages (i.e. design time, and run time).

According to the present invention, the said system comprises: a network and a host system in communication with the said network, wherein the said host system comprises a processor which is configured to execute programmed instructions for: Viewing a business process definition as a template having at least one placeholder, wherein control flow identifies the said template and a set of tasks identify at least one part, the said part comprising at least one subprocess; Plugging at least one part in the required placeholder; Composing business process from a set of parts, guided by the template, wherein the said template serves as blueprint for composing business process, thereby resulting in a composition structure, wherein the said composition structure is an inside-out view of business process; Viewing the business process as a set of tasks and placeholders, capable of interacting with tasks exposed by other business processes thereby resulting in an integrated structure for the said business process, wherein the said integrated structure is an outside-in view of business process; Combining the integrated structure and composition structure of the business process to create an agile business process, wherein the said business process comprises a sequential set of at least one event, at least one activity, process specification and at least one data element; further combining two or more agile business processes to create a business process family, wherein the said business process family is characterized in comprising a sequential set of the element, the activity, set of templates, data element and a set of activity types; and finally Integrating at least one business process definition from the business process family and at least one technology platform to create an executable business process The invention supports configuration process at different stages (i.e. design time, and run time) of the business process family and also support extension of the configuration structure at different stages (i.e. design time, and run time).

BRIEF DESCRIPTION OF THE DRAWINGS

The foregoing summary, as well as the following detailed description of preferred embodiments, is better understood when read in conjunction with the appended drawings. There is shown in the drawings example embodiments, however, the invention is not limited to the specific system and method disclosed in the drawings.

FIG. 2b illustrates a representation of the end-result of Configure operator for the configuration structure for the configurable business process of FIG. 2a.

DETAILED DESCRIPTION

Figure 1A:
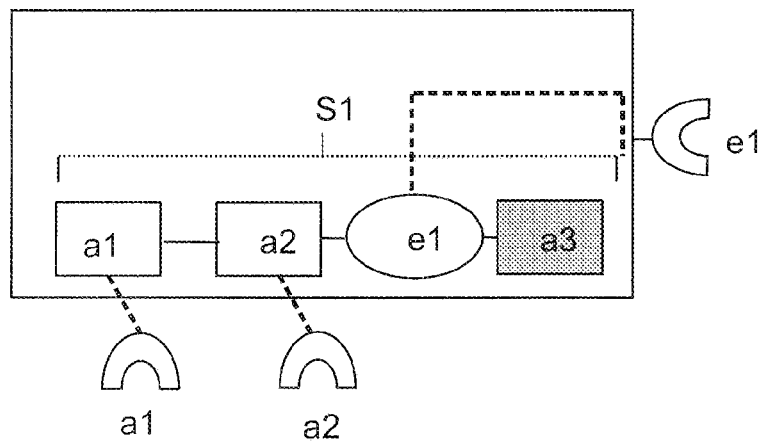
FIG. 1 illustrates a representation of a business process family.

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

The present invention is based on open-ended meta-modeling techniques. Relying on meta-modeling technique helps to address variability at different dimensions, i.e. business process composition, integration and bindings. It can be further extended for variability in other dimensions, for example roles and responsibility of human tasks, by extending business process adaptation meta model and the present invention is capable of changing variation points using situation specific activity type and kind definitions.

The present invention provides an approach that enables quick adaptation of business processes in a consistent manner. The invention uses product line concept wherein each member of a business process family comprises of family wide fixed part and member specific variant parts. The invention provides a composition operator that facilitates reuse of a business process in multiple contexts. The adaptiveness of the present invention subsumes configurability (i.e. selecting one of the many available variants) and extensibility (i.e. addition of a new variant).

The present invention provides a computationally efficient system and method for developing a set of business process definition sharing the common business intent as a business process family using model-driven techniques. By way of explanation and example, the present invention will be described in detail below using following system:

A computationally efficient system for developing a set of business process definitions sharing the common business intent as a business process family using model-driven techniques, the said system comprising: a network; and a host system in communication with the network, wherein the communication network can be selected at least one from the Local area Network (LAN), Wide Area Network (WAN), Internet, Intranet, telecommunication network, wherein the said host system having processor configured to implement programmed instructions for developing one or more executable business processes.

Enterprise can be viewed as a set of possibly interacting business processes. Business process is a control flow over a set of tasks or activities that may exchange data with each other. Also, business processes catering to similar business intent in a domain are likely to be similar in structure.

The above said host system having processor configured to implement programmed instructions for developing a set of business process definitions comprises of; In the first step, viewing a business process definition as a template having at least one placeholder, wherein control flow identifies the said template and a set of tasks identify at least one part, the said part comprising at least one sub-process; In the second step, plugging at least one part in the required placeholder.

In the third step, composing business process from a set of parts, guided by the template, wherein the said template serves as blueprint for composing business process, thereby resulting in a composition structure, wherein the said composition structure is an inside-out view of business process; In the fourth step viewing the business process as a set of tasks and placeholders, capable of interacting with tasks exposed by other business processes thereby resulting in an integrated structure for the said business process, wherein the said integrated structure is an outside-in view of business process.

Enhanced agility being imparted to the enterprises as described below. One way of improving agility would be to enable choice over a set of equivalent parts to be plugged in at a placeholder—both in composition and integration context. While enabling choice, care needs to be taken to ensure the resultant business process is well formed—structurally as well as semantically. The choice can be made available at design time or run time leading to static and dynamic composition respectively. The same holds true for integration too. In essence, the idea is to support the family concept for business processes wherein non-varying aspects (i.e. template), places where variations occur (i.e. placeholders), and variants pluggable at a placeholder (i.e. part) are modeled explicitly. In one embodiment of the invention feature modeling techniques is used to derive structurally well formed configurations of parts. In another embodiment the onus of ensuring semantic well formed-ness of configurations is left to the choice of the modelers.

The above said system and method present abstractions for describing template, part, placeholder, composition structure and integration structure. It also presents operators for deriving a larger part through composition, selecting a part from the list of available options, and modifying a part so as to meet the context specific requirements. Though these ideas are discussed here in the context of business processes only, they are found equally applicable to the other behavioral aspect of an enterprise application e.g. application services.

In the next step of the proposed method, the processor is configured to execute the programmed instructions for combining the integrated or interaction structure and composition structure of the business process to create an agile business process (P), wherein the wherein the business process comprises a sequential set of at least one event, at least one activity, process specification and at least one data element; According to one embodiment of the invention, business process is a control flow over a set of activities and events. An activity is either atomic or composite. A composite activity can be decomposed into a set of fine-grained activities, it can be visualized as control flow over its constituent activities i.e. just like a business process whereas an atomic activity is an atomic unit of work realized either manually or automated through an application service. The said system defines a business process (P) as a tuple <E, A, s, D>, where E is the set of events raised or consumed by the process,
A is the set of activities of the process,
s is a process specification describing the control flow over A and E,
D is a set of data elements defining the process state,
  Each data element is identified by data type.
  Each event carries data elements
  Each activity consumes and produces data elements as input and output.
Activity (A) further comprises of a sequential set of activities, at least one input data consumed by the activity, at least one output data produced by the activity, and nature of the activity. According to one exemplary embodiment of the invention, the above said system defines an activity as a tuple <Name, In, Out, Kind>, where
  Name: Name of the activity
  In: Set of data objects that an activity consumes as input parameters
  Out: Set of data objects that an activity produces as output parameters
  Kind/Nature of the activity: Composite or Atomic or Communicating According to the one exemplary embodiment of the invention, composite Activity is an activity that can be broken down into finer activities and can be specified as a flow over other activities. Thus, each composite activity is essentially a process definition (P). Further, atomic Activity is an atomic unit of work either automated through an application service (i.e. Service Task) or carried out manually (Manual Task)

Communicating Activity is interaction behavior of activity with other business processes. It is further classified into three categories, Invoke, Receive and Reply. The semantics of these categories are similar to BPEL/BPMN Invoke, Receive, and Reply semantics.

In one embodiment of the invention, the business process specification languages are practiced in the industry which is capable of supporting this abstraction.

In one embodiment of the invention the above said processor is configured to combine two or more agile business processes to create a business process family, wherein the said business process family is characterized in comprising a sequential set of the element, the activity, a set of templates, the data element and a set of activity types. Business process family (PF) denotes a set of related business processes having well-defined commonality and a priori known variability. According to one exemplary embodiment of the invention, the above said system defines PF as a tuple <E, A, S', D, TKV>, where E, A, D are same as business process definition P.
S' is a set of templates, essentially each template is process specification s of business process definition P.
TKV is set of activity types. Two types of activities:— abstract and concrete. Each element tkv ∈TKV is tuple <P, C> where P is a set of abstract activities, i.e. placeholders, and C is set of concrete activities.

In the next step of the proposed method, the processor is configured to execute the programmed instructions for integrating at least one business process definition from the business process family and at least one technology platform to create an executable business process, wherein the technology platform comprises of a Server which can be a Single or Multi-core processor running operating system such as Unix, Linux, Mac OS, MicroSoft Windows, MVS, Solaris etc, a Process execution engine such as Websphere, Jboss/Jbpm etc, and a Client running operating system such as Microsoft Windows, Mac OS etc.

Figure 1B:
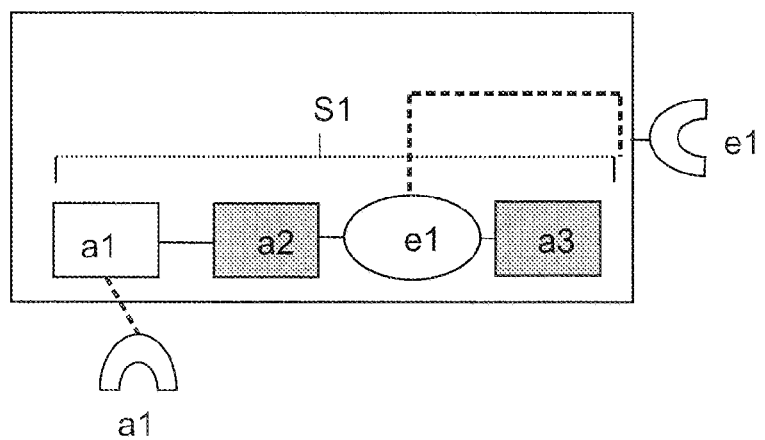
Figure 1C:
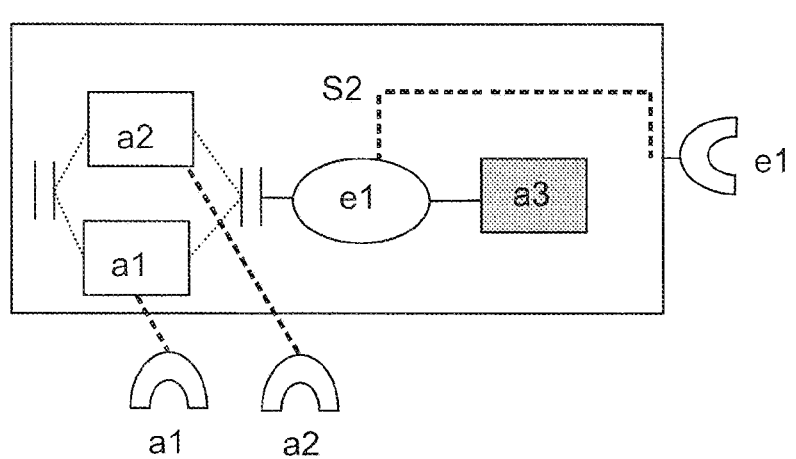

FIG. 1 illustrates a representation of a business process family according to one embodiment of the invention. The business process family comprises of three members. First two members expose activities $a_1$ and $a_2$, and event $e_1$ as placeholders with different process definition templates $S_1$ and $S_2$. Third member exposes activity a1 and event e1 as placeholders with process definition template $S_1$.

A process family is well formed if type of all activities are defined, i.e., $\forall$tkv ∈ TKV, tkv.P ∪ tkv.c=A According to one embodiment of the invention, the business process family further comprises at least one configurable business process, wherein the said configurable business process has at least one placeholder and at least one template contains at least one abstract activity. According to another embodiment of the invention, configurable business process comprises the element, the activity, a set of templates, process specification and a set of activity types, wherein the set of activity types is an element of the sequential set of abstract activity and concrete activity.

According to one exemplary embodiment of the invention, configurable business process ($P_{cfg}$) is a member of a business process family having placeholder(s), i.e. a process specification (template) containing at least one abstract activity. Formally configurable business process ($P_{cfg}$) of a process family PF=<E, A, S', D, TKV> is defined as $P_{cfg}$=<E, A, s, D, tkv, > where tkv $\in$ TKV and tkv.P$\neq\phi$, s $\in$ S'.

For instance, <$e_1$, {$a_1$, $a_2$}, $s_1$, D, {tkv1={{a1, a2} { }}> of FIG. 1 is a configurable business process with $s_1$ as its template and $e_1$, $a_1$ and $a_2$ as its placeholders. Since $P_{cfg}$ contains placeholders and a placeholder is candidate for fitment by multiple parts, $P_{cfg}$ too is a process family. Therefore, $P_{cfg}$ can be configured to service specific business intent by choosing a specific part for a placeholder and selecting specific specification. The choice can be fixed either at process design time or process run time. The resultant process must be well-formed both structurally and semantically. Configuration structure defines the context for correct structural configuration. Onus of semantic correctness of the configuration is on the modelers.

In another embodiment of the invention, relationship of the different configurable business processes produces a configuration structure, wherein the configuration structure comprises a sequential set of the configurable business process, a set of business processes and a mapping, wherein a mapping describes fitment of the part at the placeholder and could either be an activity map or an event map.

According to another exemplary embodiment of the invention, configuration structure describes the entire configuration context in terms of parts that can be fitted at placeholders. Configuration structure (CS) is a tuple <$P_{cfg}$, PS, Map> where, $P_{cfg}$ is the configurable process with placeholders PS is a set of business processes i.e. candidate parts for the placeholders Map is a set of mappings describing fitment of a part at a placeholder. There are two kinds of maps namely activity map ($a_{map}$) and event map ($e_{map}$)

Activity map $a_{map}$=Psrc.ai→$P_{dst}$.aj, such that, $P_{src} \in P_{cfg} \cup PS$ $P_{dst} \in PS$ $P_{src}$.ai is abstract activity $P_{src}$.ai and $P_{dst}$.aj are compatible, i.e. source and destination activities are compatible w.r.t. activity kind, inputs, and outputs.

If $P_{dst}$.aj is an abstract activity then there exists a valid $a_{map}$ for $P_{dst}$.aj in Map Similarly, Event map $e_{map}$=$P_{src}$.ei→$P_{dst}$.ej, such that, $P_{src} \in P_{cfg} \cup PS$ $P_{dst} \in PS$ $P_{src}$.ei and $P_{dst}$.ej are compatible, i.e. compatible with respect to the data elements.

Figure 2A:
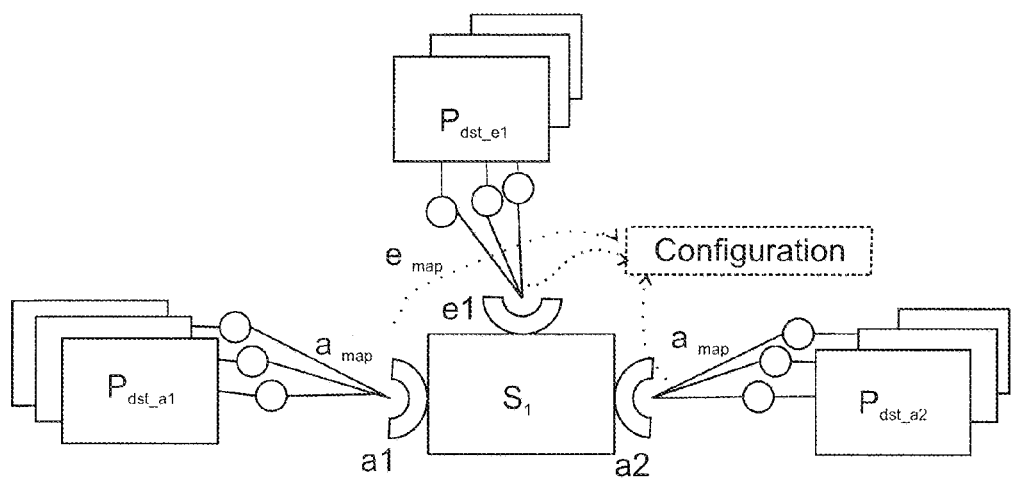
FIG. 2a illustrates a representation of configuration structure for a configurable business process.

FIG. 2a illustrates a pictorial representation of configuration structure for a configurable business process. $S_1$ denotes the business process specification template that has $a_1$ and $a_2$ as activity placeholders and $e_1$ as event. $P_{dst\_a1}$ is one of the set of candidate processes (parts) for plugging in at a1, Similarly, $P_{dst\_a2}$ for $a_2$ and $P_{dst\_e1}$ for $e_1$. The Configuration structure is complete when there is a part for every placeholder. The Configuration structure is well-formed when there is no part that is type incompatible with its placeholder. Onus of ensuring semantic well-formed-ness, i.e. fitting parts meet the desired business intent, is solely with the process designer. Configuration structure serves the purpose of composition structure and integration structure based on activity types and their corresponding mappings.

The system defines extension as enhancing configuration structure in order to support new situations. Configuration structure is extended in one of the following ways:—i) adding a new mapping over existing parts and templates, ii) adding new parts and iii) adding new templates. The system supports extensions to process family at design time only. However, run time extensions in terms of addition of new configurations seem possible.

After extending the configuration structure, the processor executes the programmed instructions for integrating the business process definition of the configuration structure and at least one technology platform to create an executable business process, wherein the technology platform comprises of a Server which can be a Single or Multi-core processor running operating system such as Unix, Linux, Mac OS, MicroSoft Windows, MVS, Solaris etc, a Process execution engine such as Websphere, Jboss/Jbpm etc, and a Client running operating system such as Microsoft Windows, Mac OS etc.

According to one exemplary embodiment of the invention, configuration (cfg) denotes a set of parts that can be plugged in at the placeholders of a configurable process such that the resultant business process is complete and consistent. A configurable business process is complete if all its placeholders are plugged in. A configurable business process is consistent if every part that plugs in at a placeholder is compatible. Thus, configuration is a subset of Map. For instance, Configuration of FIG. 2a, a placeholder can be seen as a variation point and its candidate set of parts as variants. Thus, Configuration structure defines a feature model. A configuration, then, is a valid feature configuration over the feature model.

Figure 2B:
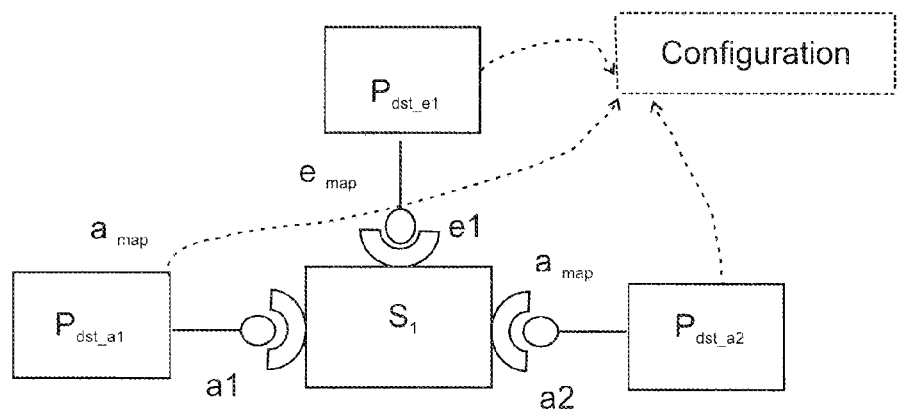

FIG. 2b illustrates a representation of the end-result of Configure operator for the configuration structure for the configurable business process of FIG. 2a. According to one exemplary embodiment of the invention, configuration is an act of selecting from many alternatives available. Configure operator of a configurable business process ($P_{cfg}$) over a configuration structure (CS) for a configuration (cfg) returns a complete and structurally well-formed business process i.e. PR=Configure ($P_{cfg}$, CS, cfg). $P_R$ is a configuration of $P_{cfg}$ for a specific situation. Configuration structure determines all the situations that $P_{cfg}$ can be configured for those situations.

The system supports configuration to be decided either at process design time or at run time. Deferral of the configuration decision to run time is supported by making the configuration information (i.e. cfg) available in the form of meta-data for interpretation by process execution engine.

Composition is an act of deriving a larger unit from parts. According to present invention, the concept of composition is similar to the concept of service orchestration where the specification of the larger unit decides which part goes in where in order to achieve the larger objective. In a preferred embodiment of the invention the process composition is supported at design time only.

In one embodiment of the invention the proposed business process meta-model is a pure extension of BPMN specification and, is capable of specifying the changes related to activity types, compositions, integration and binding aspects of business process. It can further be extended for addressing other aspects, for example, the variability related to role and responsibility of human tasks. The present invention addresses meta-model extensions and design patterns through a set of operators with suitable well formedness criteria. This helps in creating new variants and configuring them in a consistent manner.

Figure 3A:
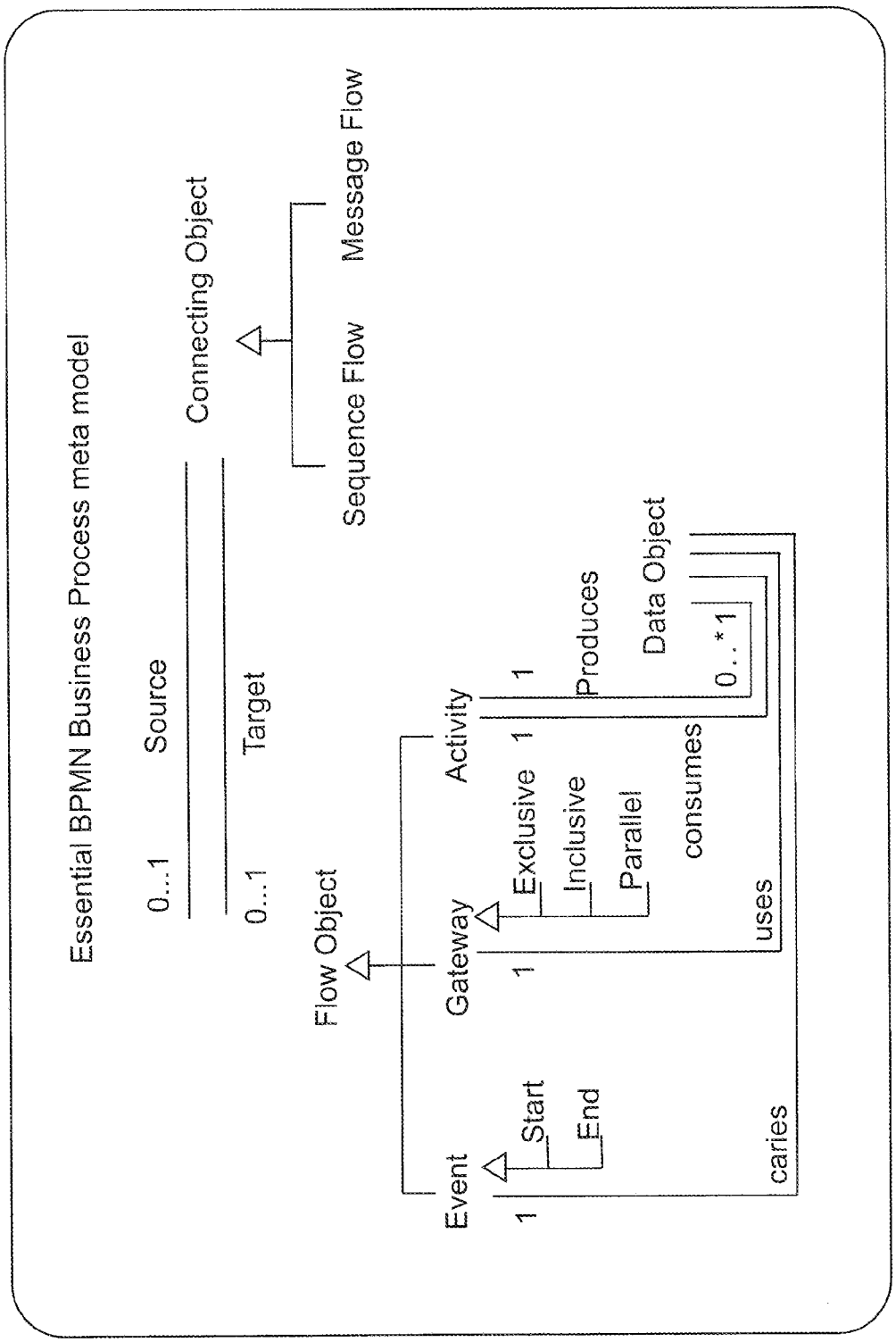
FIG. 3 illustrates meta-model for specifying business process families as an extension of essential BPMN meta-model.
Figure 3B:
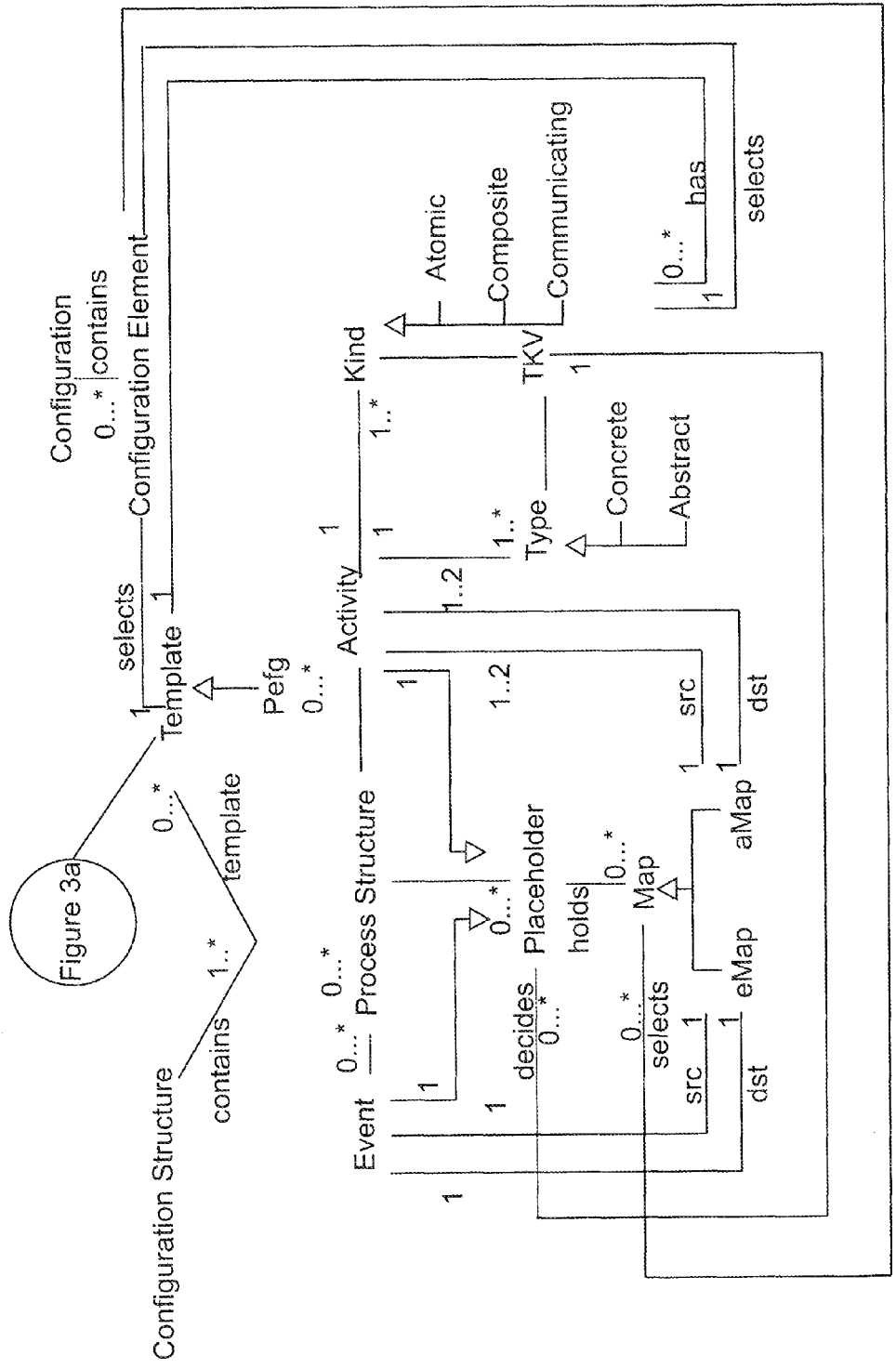

FIG. 3 illustrates meta-model for specifying business process families as an extension of essential BPMN meta-model. The invention provides a computationally efficient system for developing a set of business process definitions sharing the common business intent as a business process family using model driven technique, the said system comprising: a network; and a host system in communication with the network, the said host system having processor configured to execute programmed instructions for: In first step, specifying a business process family as an extension of essential BPMN meta model; In the next step, Viewing a business process definition as a set of connecting objects which connect a set of flow objects exchanging data objects using the said essential BPMN meta model; In the next step, capturing a process structure for specifying concrete business processes using essential BPMN meta model; In the next step, enabling an activity to be specified as a placeholder and making another process to fit in via orchestration or choreography by using essential BPMN meta model.

However, this does not support i) orchestrating a given set of services as per multiple flow definitions, or ii) orchestrating multiple sets of services as per multiple flow definitions.

In order to support (i) and (ii), the system defines a BPMN meta model to support a process family concept that comprises the processor implemented steps of: describing the business process family by using a process structure, wherein the Process structure is defined by set of activities and events, wherein Fixed set of activities and events participate in many control flow definitions, each termed as template; In the next step, essentially specifying each template by using BPMN meta model as described in FIG. 3; In the next step, introducing two dimensions of variability, namely Type and Kind, for Activity, wherein the Kind of an activity can either be Composite or Atomic or Communicating and Type of an activity can either be Concrete or Abstract. TKV depicts a specific combination of type and kind for an activity. One can specify multiple TKVs for a process structure; In the next step, a placeholder introduced to support two kinds of variability with respect to composition and integration, wherein the placeholder comprises of an Event activity or an Abstract Activity, i.e. each placeholder is derived from TKV definition; In the next step, composition or integration of a process part are defined at the placeholder by using a map, wherein the map comprises of an event map (specifying process integration) or an activity map (specifying process composition or integration as described in table 1 and Valid mappings and the corresponding variability are depicted Table 1;

Configuration structure is introduced in the next step to describe entire configuration context in terms of the parts that can be fitted at placeholders.

The model well formed-ness rules are:

For activity map defining process composition,
  IN data elements of the source activity is a superset of IN data elements of the destination activity
  OUT data elements of the source activity is a subset of OUT data elements of the destination activity For activity map defining process integration,
  IN data elements of the source activity is a subset of OUT data elements of the destination activity
  OUT data elements of the source activity is a superset of IN data elements of the destination activity For event map defining process integration
  Data elements of the source event is a superset of data elements of the destination activity In the next step, multiple placeholders and a set of candidate processes for each placeholders are specified to enable, modeling of a business process family; and in the final step, at least one business process definition from the business process family and at least one technology platform can be integrated to create an executable business process, wherein the technology platform comprises of a Server which can be a Single or Multi-core processor running operating system such as Unix, Linux, Mac OS, MicroSoft Windows, MVS, Solaris etc, a Process execution engine such as Websphere, Jboss/Jbpm etc, and a Client running operating system such as Microsoft Windows, Mac OS etc.

Mechanisms like feature models can be used to specify selection over candidate parts of a placeholder. The selection can be fixed at process design time or deferred to process runtime. The system supports the latter by making the selection mechanism available as runtime metadata. Defining an internally consistent set of parts—at least one each for a placeholder so that there are no 'holes'—is termed as a Configuration. Defining a new placeholder or adding a new part for an existing placeholder is termed as Extension.

Thus, the meta-model in shown in the FIG. 3 enables modeling of a business process family wherein each member serves the same intent in a specific situation. In one embodiment of the invention new situation can be addressed by configuring available alternatives or, adding new variants and configuring them appropriately. Thus one can adapt to a new situation by switching over to the suitable variants.

The invention is described in the example given below which is provided only to illustrate the invention and therefore should not be construed to limit the scope of the invention.

TABLE 1

Valid Activity & Event Mappings

| Source end of Map | | Destination end of Map | | | | | |
|---|---|---|---|---|---|---|---|
| | | Concrete Activity | | Abstract Activity | | | |
| | | Atomic | Composite | Atomic | Composite | Communicating | Event |
| Abstract Activity | Atomic | X | Composition | X | Variable Composition* | Integration | X |
| | Composite | X | X | X | X | X | |
| | Communicating | X | X | X | X | Integration | |
| Event | | X | | X | | | Integration |

Different enterprises from the same business domain may service the same intent in different ways for example account opening processes of different banks are slightly different from one another. Thus, there is a significant commonality across these processes. Present inability to capture this commonality and the variability leads to multiple process definitions. As a result, any change in the common part needs to be introduced in all process definitions and that too in a consistent manner. Thus, being ignorant of the commonality means redundancy in process definitions leading to maintenance and evolution problems later. The present invention provides for modeling of commonality and variability so that a set of business processes definitions sharing the common business intent can be modeled as a business process family.

Figure 4:
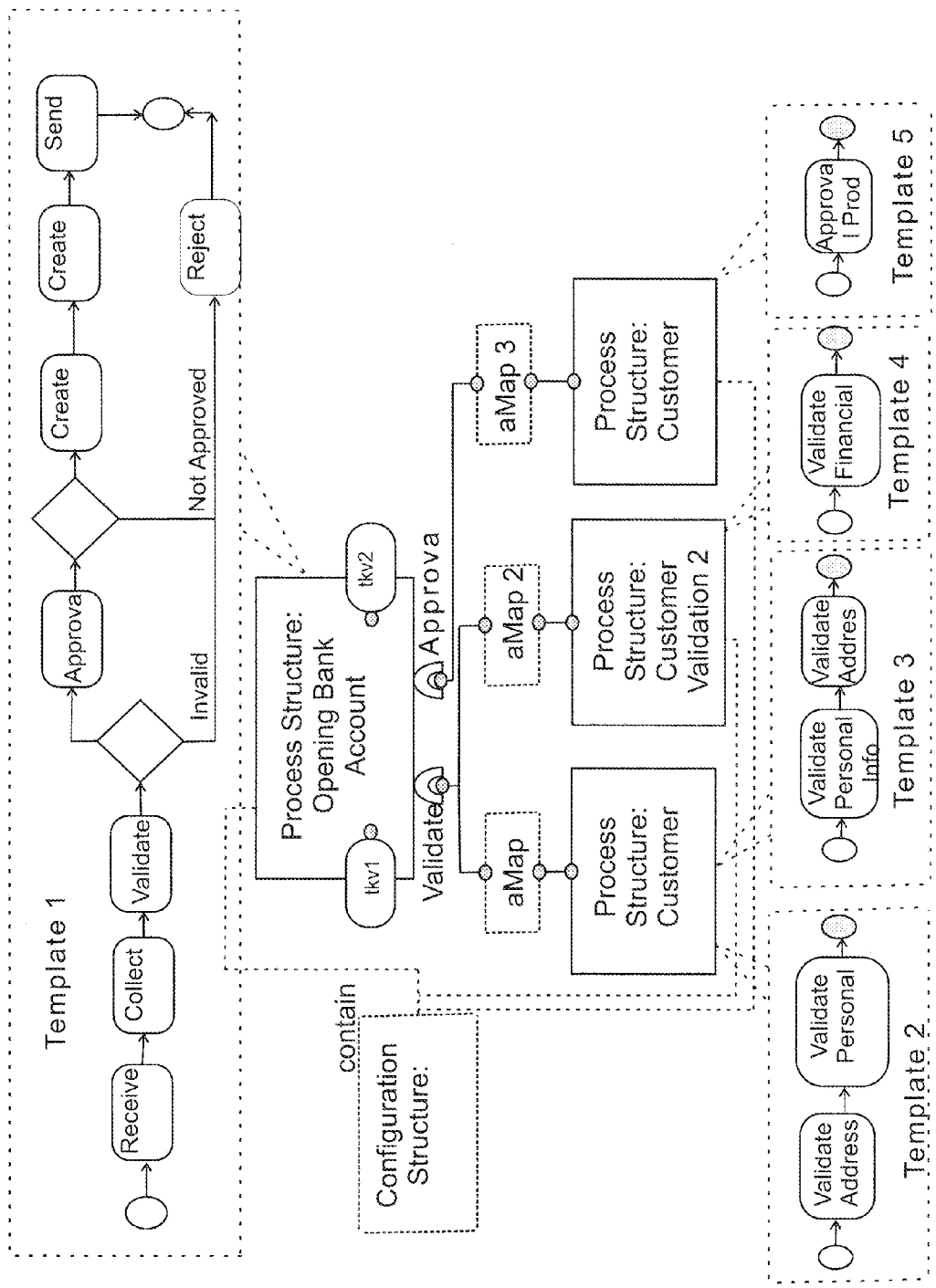
FIG. 4 shows illustrative example of a business process family supporting different context specific requirements for opening a banking account.

FIG. 4 shows an illustrative example of a business process family supporting different context specific requirements for opening a banking account. The system uses a simplified bank account opening process to illustrate variability, configurability and extensibility. Let's consider the account opening process that is a control flow of set of activities A={Receive Request, Collect Information, Validate, Approval, Create Profile, Create Account, Send Details, Reject Request} as depicted in the FIG. 4. In this process definition process step, validate, is defined as context specific, i.e. behavior of the step is different in different contexts. Let's consider differences in the context specific behaviors along the following dimensions a) performing the same set of activities in different order, let's say one would like to execute verify address and verify personal detail as part of validate process step but in different sequence, b) performing different set of activities, let's say one would like to verify financial details instead of verifying address and personal details. In this FIG. 4 the account opening process is primarily a configurable business process $P_{AccOpen}$=<E, A, template1, D, tkv1} of a process family PF=<E, A, {template1}, D, TKV}>, where A={Receive Request, Collect Information, Validate, Approval, Create Profile, Create Account, Send Details, Reject Request},

E={ }, template1=instance of essential BPMN meta model, and

TKV={tkv1, tkv2} where tkv1={P={validate}, C={A−{validate}}} and tkv2={P={validate,Approval}, C={A−{validate, Approval}}}

The behaviors of configurable business process $P_{AccOpen}$ can differ as different parts can be fitted at defined placeholder, i.e. abstract activity validate. Process configuration structure CS=<$P_{AccOpen}$, {Customer Validation1, Customer Validation 2}, {aMap1=validate→Customer Validation1, aMap2=validate→Customer Validation2}> of business configurable process $P_{AccOpen}$ supports different behavioral variances through different configurations as follows:

Configuration1 and Configuration2 support validating address and personal information as part of validate process step. Configuration3 supports validating financial status as part of validate.

The business process family of FIG. 4 can be extended along the following dimensions—i) a process step containing abstract activities can be refined by defining a new process step and mapping it to the abstract activity. For example approval process step of the account opening process can be refined by defining it as abstract activity using tkv2, providing refined process steps using template5 and corresponding map aMap3, ii) behavioral variability in existing placeholders can be added by adding process steps and corresponding map, and iii) control flow of an existing process structure can be changed by adding a new template in the existing process structure.

After creating at least one business process definition, the processor is configured to integrate at least one the business process definition from the business process family and at least one technology platform to create an executable business process, wherein the technology platform comprises of a Server which can be a Single or Multi-core processor running operating system such as Unix, Linux, Mac OS, MicroSoft Windows, MVS, Solaris etc, a Process execution engine such as Websphere, Jboss/Jbpm etc, and a Client running operating system such as Microsoft Windows, Mac OS etc.

The example illustrates extensibility and configurability of business process in a limited context—through variation points in the form of activity and activity type, variations thereof, and composition mechanism that enables fitment of a variation at a variation point. However, it is straightforward to expand adaptive capacity by supporting extensibility and configurability for service mapping between concrete activities (of service type) to service, and between activity to activity mappings for process to process integration. This enables open ended extensions of business processes along multiple dimensions namely, activity type, composition, integration and service binding.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: tangible media; solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this invention pertains will appreciate that alterations and changes in the described structures and methods of operation can be practiced without meaningfully departing from the principle and scope.

We claim:

1. A computationally efficient system for developing a set of business process definitions sharing the common business intent as a business process family using model driven techniques, the said system comprising: a network; and
a host system in communication with the network, the said host system having processor configured to execute programmed instructions for:
a) Viewing a business process definition as a template having at least one placeholder, wherein control flow identifies the said template and a set of tasks identify at least one part indicative of a variation, the said part comprising at least one sub-process;
b) Plugging at least one part in the required placeholder;
c) Composing business process from a set of parts, guided by the template, wherein the said template serves as blueprint for composing business process, thereby resulting in a composition structure, wherein the said composition structure is an inside-out view of business process;
d) Viewing the business process as a set of tasks and placeholders, capable of interacting with tasks exposed by other business processes thereby resulting in an integrated structure for the said business process, wherein the said integrated structure is an outside-in view of business process;
e) Combining the integrated structure and composition structure of the business process to create an agile business process, wherein the said business process comprises a sequential set of at least one event, at least one activity, process specification and at least one data element;
f) Combining two or more agile business processes to create a business process family, wherein the said business process family is characterized in comprising a sequential set of the element, the activity, set of templates, data element and a set of activity types; and
g) Integrating at least one business process definition from the business process family and at least one technology platform to create an executable business process.

2. The system of claim 1, wherein the activity further comprises a sequential set of activities, at least one input data consumed by the activity, at least one output data produced by the activity and nature of the activity.

3. The system of claim 2, wherein the nature of the activity can be selected at least one from the group of composite activity, atomic activity or communicating activity.

4. The system of claim 1, wherein the set of activity types further comprises a sequential set of abstract activity and concrete activity.

5. The system of claim 1, wherein the business process family further comprises at least one configurable business process.

6. The system of claim 5, wherein the configurable business process has at least one placeholder and at least one template contains at least one abstract activity.

7. The system of claim 5, wherein the configurable business process comprises the element, the activity, a set of templates, process specification and a set of activity types.

8. The system of claim 7, wherein the set of activity types is an element of the sequential set of abstract activity and concrete activity.

9. The system of claim 7, wherein relationship of the different configurable business processes produces a configuration structure, wherein the configuration structure is a sequential set of the configurable business process, a set of business processes and a mapping.

10. The system of claim 9, wherein the mapping describes a fitment of the part at the placeholder and the mapping comprises of an activity map or an event map.

11. The system of claim 9, wherein the configuration structure can be extended by adding a new mapping over existing parts and templates, adding new parts or adding new templates.

12. The system of claim 5, wherein configuration of the configurable business process over the configuration structure can be done by using a configure operator.

* * * * *